United States Patent
Yu et al.

(10) Patent No.: US 11,405,489 B2
(45) Date of Patent: Aug. 2, 2022

(54) METHOD AND APPARATUS FOR DETERMINING QUALITY OF SERVICE, AND STORAGE MEDIUM

(71) Applicant: Huawei Technologies Co., Ltd., Shenzhen (CN)

(72) Inventors: Boyuan Yu, Nanjing (CN); Mingli Zhang, Nanjing (CN); Naiqiang Qiao, Nanjing (CN); Bo Guan, Shenzhen (CN); Jun Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 16/832,676

(22) Filed: Mar. 27, 2020

(65) Prior Publication Data

US 2020/0228633 A1 Jul. 16, 2020

Related U.S. Application Data (63) Continuation of application No. PCT/CN2018/094294, filed on Jul. 3, 2018.

(30) Foreign Application Priority Data

Sep. 30, 2017 (CN) .......................... 201710944073.X (51) Int. Cl.
*H04L 29/06* (2006.01)
*H04L 69/16* (2022.01)
(Continued)

(52) U.S. Cl.
CPC ........ *H04L 69/161* (2013.01); *H04L 41/5006* (2013.01); *H04L 67/28* (2013.01); *H04L 2212/00* (2013.01)

(58) Field of Classification Search
CPC ..... H04L 69/14; H04L 69/16; H04L 61/2007; H04L 65/80; H04L 45/16; H04L 43/08
See application file for complete search history.

(56) References Cited

U.S. PATENT DOCUMENTS 8,315,241 B2 11/2012 Iyer et al.
2007/0104224 A1 5/2007 Conner et al.
(Continued)

FOREIGN PATENT DOCUMENTS

CN 101282282 A 10/2008
CN 105490933 A 4/2016
(Continued)

OTHER PUBLICATIONS

Boucadair, M., et al., "An MPTCP Option for Network-Assisted MPTCP Deployments: Plain Transpod Mode," draft-boucadair-mptcp-plain-mode-08, Jul. 4, 2016, 34 pages. XP015113859.
(Continued)

*Primary Examiner* — Romani Ohri
(74) *Attorney, Agent, or Firm* — Conley Rose, P.C.

(57) ABSTRACT

A method for determining quality of service (QoS) includes receiving a first Internet Protocol (IP) packet, where the first IP packet includes a User Datagram Protocol (UDP) packet and a first IP header, determining, based on information in the first IP packet, a target QoS level to which the UDP packet belongs, dividing the UDP packet into at least two segments, encapsulating each of the at least two segments into a Multipath Transmission Control Protocol (MPTCP) packet, encapsulating the MPTCP packet into a second IP packet, where a payload length of a target IP packet in the second IP packet is equal to a byte length corresponding to the target QoS level, and sending the second IP packet to a peer device using an MPTCP connection with the peer (Continued)

device such that the peer device determines the target QoS level based on the payload length of the target IP packet.

20 Claims, 5 Drawing Sheets

(51) Int. Cl.
*H04L 41/5006* (2022.01)
*H04L 67/56* (2022.01)

(56) References Cited

U.S. PATENT DOCUMENTS

| | | |
|---|---|---|
| 2007/0297450 A1 | 12/2007 | Smolinske et al. |
| 2008/0123660 A1 | 5/2008 | Sammour et al. |
| 2009/0245224 A1 | 10/2009 | Iyer et al. |
| 2009/0285108 A1 | 11/2009 | Venugopal et al. |
| 2009/0323548 A1 | 12/2009 | Yu |
| 2010/0157831 A1 | 6/2010 | Takeuchi et al. |
| 2012/0144062 A1 | 6/2012 | Livet et al. |
| 2017/0063699 A1 | 3/2017 | Kim |
| 2017/0104717 A1 | 4/2017 | Vesterinen et al. |
| 2017/0105138 A1 | 4/2017 | Huang et al. |
| 2018/0184474 A1* | 6/2018 | Skog ..................... H04W 76/15 |
| 2019/0110231 A1* | 4/2019 | Youn .................. H04L 12/4633 |
| 2020/0163004 A1* | 5/2020 | Demianchik ...... H04W 28/0252 |
| 2020/0322841 A1* | 10/2020 | Hyun .................... H04W 72/12 |
| 2020/0359264 A1* | 11/2020 | Racz ................. H04W 28/0967 |

FOREIGN PATENT DOCUMENTS

| | | |
|---|---|---|
| CN | 106664732 A | 5/2017 |
| EP | 3119057 A1 | 1/2017 |
| JP | 2010148021 A | 7/2010 |
| KR | 20080064146 A | 7/2008 |
| KR | 20170018057 A | 2/2017 |
| WO | 2008021182 A2 | 2/2008 |
| WO | WO-2008021182 A2 * | 2/2008 ............. H04L 47/10 |

OTHER PUBLICATIONS

Boucadair, M., et al., "Network-Assisted MPTCP: Use Cases, Deployment Scenarios and Operational Considerstions," draft-nam-mptcp-deployment-considerstions-01, Dec. 7, 2016, 29 pages. XP015116956.

Ford, A., "Tcp Extensions for Multipath Operation with Multiple Addresses," RFC 6824, Jan. 2013, 64 pages.

Miori, S., et al., "Cross-Layer Designed Adaptive Packet Length Control for Wireless Network," IEICE Technical Report RCS2011-32, May 2011, 8 pages.

* cited by examiner

METHOD AND APPARATUS FOR DETERMINING QUALITY OF SERVICE, AND STORAGE MEDIUM

CROSS-REFERENCE TO RELATED APPLICATIONS

This application is a continuation application of International Application No. PCT/CN2018/094294, filed on Jul. 3, 2018, which claims priority to Chinese Patent Application No. 201710944073.X, filed on Sep. 30, 2017. The disclosures of the aforementioned applications are hereby incorporated by reference in their entireties.

TECHNICAL FIELD

The present disclosure relates to the field of communications technologies, and in particular, to a method and an apparatus for determining quality of service (QoS), and a storage medium.

BACKGROUND

A Multipath Transmission Control Protocol (MPTCP) is a transport layer protocol in which a plurality of paths are used for concurrent transmission such that an end-to-end throughput can be increased and network utilization can be improved. Services on a network mainly include a Transmission Control Protocol (TCP) service and a User Datagram Protocol (UDP) service. The TCP service and the UDP service use different protocols. Therefore, a TCP service stream and a UDP service stream are transmitted in different manners in the MPTCP.

The UDP service stream is usually transmitted in the MPTCP using a tunneling technology. In an embodiment, after receiving a UDP packet, a device such as a router encapsulates an MPTCP header and a new IP header outside an internet protocol (IP) packet in which the UDP packet is encapsulated, to obtain a new packet, and then sends the new packet to a peer end using an MPTCP connection. The original IP packet (for example, an IP header of the original IP packet or a UDP header of the UDP packet) in which the UDP packet is encapsulated includes QoS information. The QoS information may be used to determine a QoS level of the UDP packet.

When the UDP service stream is transmitted in the MPTCP, the new TCP header and the new IP header are encapsulated outside the original UDP packet, but there is no QoS information in the IP header that is encapsulated on an outermost side of the UDP packet. Therefore, after receiving the UDP packet, a peer device receiving the UDP packet cannot obtain the QoS information, and consequently cannot determine the QoS level of the UDP packet. As a result, the peer device cannot perform corresponding QoS processing on the UDP packet accurately.

SUMMARY

This application provides a method and an apparatus for determining QoS, and a storage medium, to resolve a problem that corresponding QoS processing cannot be accurately performed on a UDP packet.

According to a first aspect, this application provides a method for determining QoS, including receiving a first IP packet, where the first IP packet includes a UDP packet and a first IP header, determining, based on information in the first IP packet, a target QoS level to which the UDP packet belongs, dividing the UDP packet into at least two segments, encapsulating each of the at least two segments into a MPTCP packet, encapsulating each MPTCP packet into at least one second IP packet, where a payload length of a target IP packet in the at least one second IP packet is equal to a byte length corresponding to the target QoS level, and sending the at least one second IP packet to a peer device using an MPTCP connection with the peer device such that the peer device determines the target QoS level based on the payload length of the target IP packet.

In this application, the received UDP packet is divided into at least two segments. After each segment is encapsulated into an MPTCP packet, the MPTCP packet is encapsulated into at least one second IP packet. In addition, the payload length of the target IP packet in the at least one second IP packet is equal to the byte length corresponding to the target QoS level. In other words, a target QoS level of a same MPTCP packet is indicated using the payload length of the target IP packet. Therefore, in this application, after the second IP packet obtained through encapsulation is sent to the peer device using the MPTCP connection, the peer device may accurately determine the target QoS level of the same MPTCP packet based on the payload length of the target IP packet, and accurately perform corresponding QoS processing on the UDP packet. This avoids a problem that the peer device cannot determine the corresponding QoS processing on the UDP packet because there is no QoS information in an IP header encapsulated on an outermost side of the UDP packet.

With reference to the first aspect, in a first implementation of the first aspect, the encapsulating each MPTCP packet into at least one second IP packet includes, for a first MPTCP packet in all the MPTCP packets, dividing the first MPTCP packet into at least two MPTCP packet fragments, where a length of a target MPTCP packet fragment in the at least two MPTCP packet fragments is equal to the byte length corresponding to the target QoS level, and a length of the first MPTCP packet is greater than the byte length corresponding to the target QoS level, and encapsulating the at least two MPTCP packet fragments into corresponding second IP packets, where a second IP packet corresponding to the target MPTCP packet fragment is the target IP packet.

With reference to the first aspect or any implementation above, in a second implementation of the first aspect, the encapsulating each MPTCP packet into at least one second IP packet includes, for a second MPTCP packet in all the MPTCP packets, adding padding data to the second MPTCP packet such that a length of the second MPTCP packet to which the padding data is added is equal to the byte length corresponding to the target QoS level, where a length of the second MPTCP packet is less than the byte length corresponding to the target QoS level, and encapsulating the second MPTCP packet to which the padding data is added into a corresponding second IP packet, where the second IP packet corresponding to the second MPTCP packet to which the padding data is added is the target IP packet.

With reference to the first aspect or any implementation above, in a third implementation of the first aspect, the target IP packet is a start IP packet in the at least one second IP packet.

With reference to the first aspect or any implementation above, in a fourth implementation of the first aspect, a sum of a length of each of the at least two segments and a length of the first IP header is less than or equal to a difference between a maximum transmission unit (MTU) and a first length, and the first length is a sum of a length of an MPTCP header corresponding to each segment and a length of an IP header of a second IP packet corresponding to each segment.

With reference to the first aspect or any implementation above, in a fifth implementation of the first aspect, a sum of a length of each of the at least one segment and the length of the first IP header is less than or equal to a preset length, the preset length is a difference between the MTU and a first preset value, and the first preset value is a sum of a maximum value of an MPTCP header length and a maximum value of an IP header length.

With reference to the first aspect or any implementation above, in a sixth implementation of the first aspect, before the encapsulating each MPTCP packet into at least one second IP packet, the method further includes determining, based on a correspondence between a QoS level and a byte length, the byte length corresponding to the target QoS level.

With reference to the first aspect or any implementation above, in a seventh implementation of the first aspect, the correspondence between a QoS level and a byte length is preset, and a maximum value of a byte length corresponding to each QoS level in the correspondence is less than or equal to a sum of a minimum value of the MPTCP header length and a minimum value of the IP header length.

With reference to the first aspect or any implementation above, in an eighth implementation of the first aspect, the encapsulating each of the at least two segments into a MPTCP packet includes encapsulating the first IP header for each segment, where a payload length indication field in the first IP header is modified to a length of the corresponding segment, and encapsulating each segment after the first IP header is encapsulated into an MPTCP packet.

According to a second aspect, this application provides a method for determining QoS, including receiving, using a MPTCP connection with a peer device, at least one IP packet that belongs to a same MPTCP packet and that is sent by the peer device, obtaining a payload length of a target IP packet in the at least one IP packet, and determining, based on the payload length of the target IP packet, a target QoS level of the at least one IP packet.

In this application, the peer device indicates a target QoS level of the same MPTCP packet using the payload length of the target IP packet. Therefore, after the at least one IP packet that belongs to the same MPTCP packet is received, the target QoS level of the same MPTCP packet may be accurately determined based on the payload length of the target IP packet in the at least one IP packet, and corresponding QoS processing may be accurately performed on a UDP packet. This avoids a problem that the corresponding QoS processing on the UDP packet cannot be determined because there is no QoS information in an IP header encapsulated on an outermost side of the UDP packet.

With reference to the second aspect, in a first implementation of the second aspect, the target IP packet is a start IP packet in the at least one IP packet.

With reference to the second aspect or the first implementation of the second aspect, the payload length of the target IP packet is less than or equal to a sum of a minimum value of an MPTCP header length and a minimum value of an IP header length.

According to a third aspect, this application provides an apparatus for determining QoS, including a receiving unit configured to receive a first IP packet, where the first IP packet includes a UDP packet and a first IP header, a determining unit configured to determine, based on information in the first IP packet, a QoS target QoS level to which the UDP packet belongs, a division unit configured to divide the UDP packet into at least two segments, an encapsulation unit configured to encapsulate each of the at least two segments into a MPTCP packet, where the encapsulation unit is further configured to encapsulate each MPTCP packet into at least one second IP packet, and a payload length of a target IP packet in the at least one second IP packet is equal to a byte length corresponding to the target QoS level, and a sending unit configured to send the at least one second IP packet to a peer device using an MPTCP connection with the peer device such that the peer device determines the target QoS level based on the payload length of the target IP packet.

With reference to the third aspect, in a first implementation of the third aspect, when encapsulating each of the at least two segments into an MPTCP packet, the encapsulation unit is further configured to, for a first MPTCP packet in all the MPTCP packets, divide the first MPTCP packet into at least two MPTCP packet fragments, where a length of a target MPTCP packet fragment in the at least two MPTCP packet fragments is equal to the byte length corresponding to the target QoS level, and a length of the first MPTCP packet is greater than the byte length corresponding to the target QoS level, and encapsulate the at least two MPTCP packet fragments into corresponding second IP packets, where a second IP packet corresponding to the target MPTCP packet fragment is the target IP packet.

With reference to the third aspect or any implementation above, in a second implementation of the third aspect, when encapsulating each of the at least two segments into an MPTCP packet, the encapsulation unit is further configured to, for a second MPTCP packet in all the MPTCP packets, add padding data to the second MPTCP packet such that a length of the second MPTCP packet to which the padding data is added is equal to the byte length corresponding to the target QoS level, where a length of the second MPTCP packet is less than the byte length corresponding to the target QoS level, and encapsulate the second MPTCP packet to which the padding data is added into a corresponding second IP packet, where the second IP packet corresponding to the second MPTCP packet to which the padding data is added is the target IP packet.

With reference to the third aspect or any implementation above, in a third implementation of the third aspect, the target IP packet is a start IP packet in the at least one second IP packet.

With reference to the third aspect or any implementation above, in a fourth implementation of the third aspect, a sum of a length of each of the at least two segments and a length of the first IP header is less than or equal to a difference between a MTU and a first length, and the first length is a sum of a length of an MPTCP header corresponding to each segment and a length of an IP header of a second IP packet corresponding to each segment.

With reference to the third aspect or any implementation above, in a fifth implementation of the third aspect, a sum of a length of each of the at least one segment and the length of the first IP header is less than or equal to a preset length, the preset length is a difference between the MTU and a first preset value, and the first preset value is a sum of a maximum value of an MPTCP header length and a maximum value of an IP header length.

With reference to the third aspect or any implementation above, in a sixth implementation of the third aspect, before the encapsulation unit encapsulates each MPTCP packet into the at least one second IP packet, the determining unit is further configured to determine, based on a correspondence between a QoS level and a byte length, the byte length corresponding to the target QoS level.

With reference to the third aspect or any implementation above, in a seventh implementation of the third aspect, the correspondence between a QoS level and a byte length is preset, and a maximum value of a byte length corresponding to each QoS level in the correspondence is less than or equal to a sum of a minimum value of the MPTCP header length and a minimum value of the IP header length.

With reference to the third aspect or any implementation above, in an eighth implementation of the third aspect, when encapsulating each of the at least two segments into an MPTCP packet, the encapsulation unit is further configured to encapsulate the first IP header for each segment, where a payload length indication field in the first IP header is modified to a length of the corresponding segment, and encapsulate each segment after the first IP header is encapsulated into an MPTCP packet.

According to a fourth aspect, this application provides an apparatus for determining QoS, including a receiving unit configured to receive, using a MPTCP connection with a peer device, at least one IP packet that belongs to a same MPTCP packet and that is sent by the peer device, an obtaining unit configured to obtain a payload length of a target IP packet in the at least one IP packet, and a determining unit configured to determine, based on a length of an MPTCP packet included in the target IP packet, a target QoS level of the at least one IP packet.

With reference to the fourth aspect, in a first implementation of the fourth aspect, the target IP packet is a start IP packet in the at least one IP packet.

With reference to the fourth aspect or the first implementation of the fourth aspect, the payload length of the target IP packet is less than or equal to a sum of a minimum value of an MPTCP header length and a minimum value of an IP header length.

According to a fifth aspect, this application provides a device for determining QoS, including a memory, a processor, a communications interface, and a bus, where the memory, the processor, and the communications interface are connected to each other and communicate with each other using the bus, the memory is configured to store program code, and the processor runs, by reading executable program code stored in the memory, a program corresponding to the executable program code, to perform the method according to the first aspect.

According to a sixth aspect, this application provides a device for determining QoS, including a memory, a processor, a communications interface, and a bus, where the memory, the processor, and the communications interface are connected to each other and communicate with each other using the bus, the memory is configured to store program code, and the processor runs, by reading executable program code stored in the memory, a program corresponding to the executable program code, to perform the method according to the second aspect.

According to a seventh aspect, this application provides a data processing system, including the device for determining QoS according to the fifth aspect and the device for determining QoS according to the sixth aspect.

According to an eighth aspect, this application provides a computer-readable storage medium. The computer-readable storage medium stores an instruction, and when the instruction is run on a computer, the computer is enabled to perform the method according to the first aspect.

According to a ninth aspect, this application provides a computer-readable storage medium. The computer-readable storage medium stores an instruction, and when the instruction is run on a computer, the computer is enabled to perform the method according to the second aspect.

BRIEF DESCRIPTION OF DRAWINGS

To describe the technical solutions in the embodiments of the present disclosure more clearly, the following briefly describes the accompanying drawings required for describing the embodiments apparently.

DESCRIPTION OF EMBODIMENTS

To make the objectives, technical solutions, and advantages of the embodiments of the present disclosure clearer, the following clearly describes the technical solutions of the embodiments of the present disclosure with reference to the accompanying drawings in the embodiments of the present disclosure. In a case that no conflict occurs, the embodiments in the application and the features in the embodiments may be mutually combined.

Figure 1:
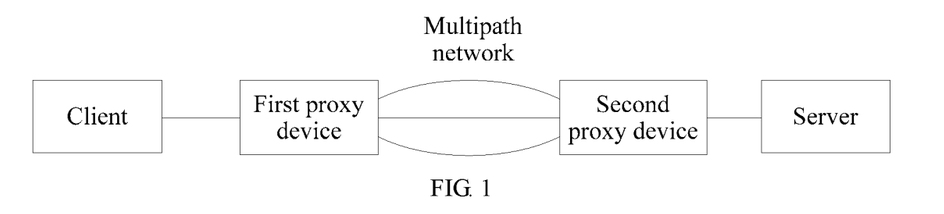
FIG. 1 is a schematic diagram of a network architecture according to an embodiment of the present disclosure.

The embodiments of the present disclosure may be applied to a scenario of determining QoS. FIG. 1 is a schematic diagram of a network architecture according to an embodiment of the present disclosure. As shown in FIG. 1, data transmission based on an MPTCP network is implemented between a client and a server using a TCP proxy. In FIG. 1, the client communicates with a first proxy device using the UDP protocol. A multipath network is between the first proxy device and a second proxy device. The multipath network may include a digital subscriber line (DSL), Long-Term Evolution (LTE), a WI-FI connection, and the like. To transmit a UDP packet in the multipath network, an MPTCP connection is established between the first proxy device and the second proxy device. The second proxy device communicates with the server using the UDP protocol. The first proxy device and the second proxy device may serve as a peer device of each other.

Specifically, the architecture shown in FIG. 1 may be applied to a bonding access (BA) scenario or a software-defined wide area network (SD-WAN) scenario. In the BA scenario, the client may be a client using the UDP protocol to host an application, for example, a computer or a mobile phone of a home user. The client may access an application on an external UDP server, for example, a video live broadcast. The first proxy device may be a network access device installed in the user's home by an operator. For example, the first proxy device may be a home gateway (HG). The first proxy device may include a plurality of interfaces, such as an asymmetric digital subscriber line (ADSL) interface, a WI-FI interface, and an LTE interface. These interfaces may be used by the first proxy device as different output interfaces for MPTCP multipath transmission, to implement hybrid access to data transmitted on a plurality of paths. The second proxy device may be a hybrid access aggregation point (HAAP), and is configured to receive hybrid access requests from different HGs. The server may be a server that uses the UDP protocol to host an application. In the SD-WAN scenario, the client may be a client that is in an enterprise branch and that uses the UDP protocol to host an application, and may be configured to access an application on a server that is in an enterprise headquarter (HQ) and that uses the UDP protocol to host an application. The first proxy device and the second proxy device may be access routing devices, and the access routing devices may include a plurality of interfaces, such as an ADSL interface, a WI-FI interface, and an LTE interface. These interfaces may be used as different output interfaces for MPTCP multipath transmission, to implement hybrid access to data transmitted on a plurality of paths. The server may be a data center server that is in an enterprise HQ and that uses the UDP protocol to host an application.

Figure 2:
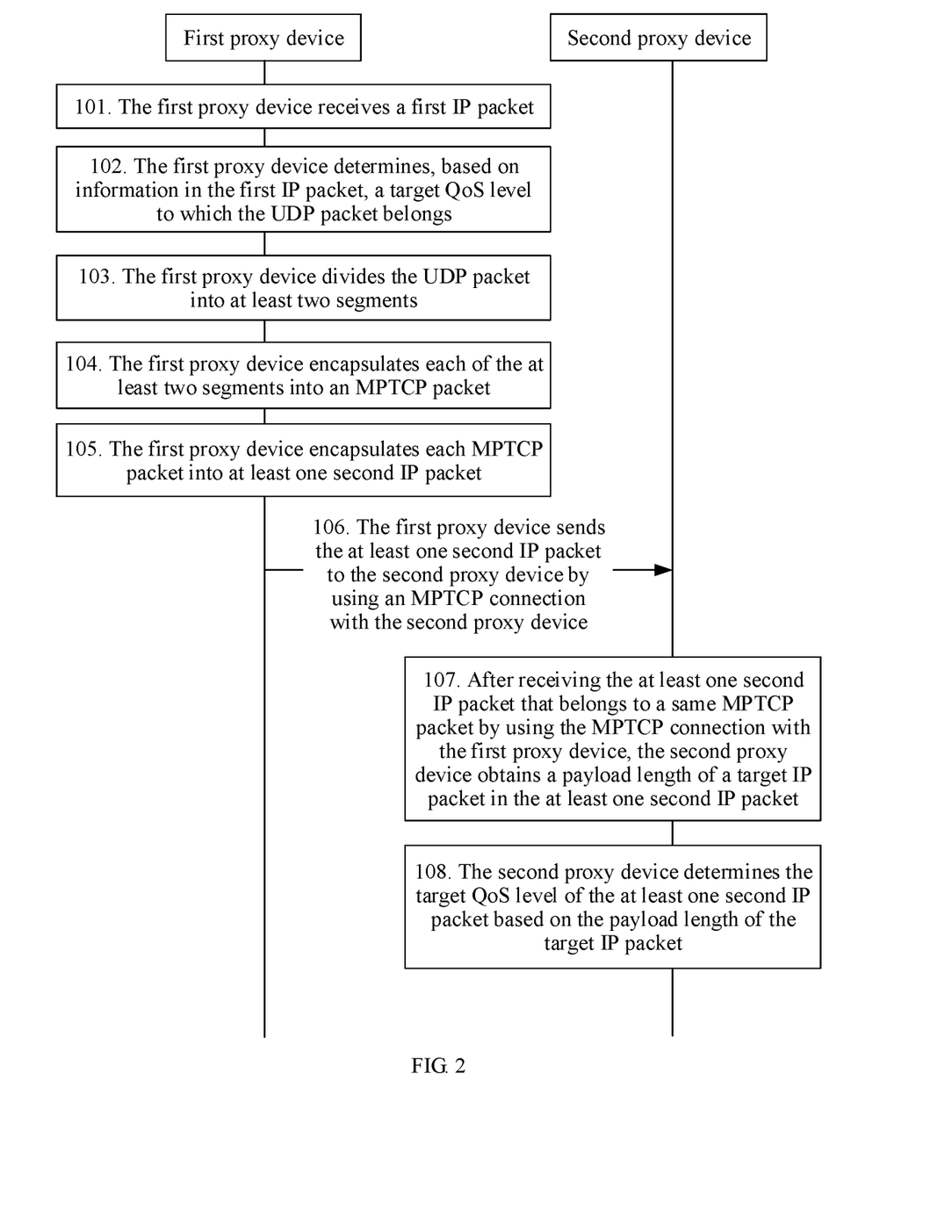
FIG. 2 is a schematic flowchart of a method for determining QoS according to an embodiment of the present disclosure.

An embodiment of the present disclosure provides a method for determining QoS. The method may be applied to the network architecture shown in FIG. 1. As shown in FIG. 2, the method includes the following steps.

101. A first proxy device receives a first IP packet.

When a client needs to communicate with a server, the client sends the first IP packet to the first proxy device using a UDP protocol between the client and the first proxy device. The first IP packet includes a UDP packet and a first IP header. In other words, the UDP packet is payload of the first IP packet. The UDP packet includes payload and a UDP header. The first IP header includes QoS information and a payload length indication field. In this case, the payload length indication field in the first IP header indicates a length of the UDP packet. The first proxy device receives the first IP packet, and may separately store the UDP packet and the first IP header of the first IP packet.

102. The first proxy device determines, based on information in the first IP packet, a target QoS level to which the UDP packet belongs.

The first proxy device may determine, based on the QoS information included in the first IP header and/or a packet header (namely, the UDP header) of the UDP packet, the target QoS level to which the UDP packet belongs. The QoS information may further include one or any combination of information included in the first IP packet, such as a source IP address, a destination IP address, or a differentiated services code point (DSCP).

Specifically, a QoS level classification rule may be preset in the first proxy device. For example, the QoS level classification rule may be a correspondence between a QoS level and a source IP address and/or a destination IP address. After the first IP packet is received, the target QoS level to which the UDP packet belongs may be determined based on information (for example, the source IP address and the destination IP address) included in the first IP header and the preset QoS level classification rule. The QoS level classification rule may include a plurality of QoS levels. Different QoS levels correspond to different processing manners. For example, transmission queues of different priorities are used for transmission. In addition, a QoS value corresponding to each QoS level may be further set in the first proxy device, and the QoS level may be indicated using the QoS value. For example, if there are eight QoS levels, QoS values corresponding to the QoS levels may be set to numbers 1 to 8 in sequence.

103. The first proxy device divides the UDP packet into at least two segments.

The first proxy device transmits data using an MPTCP connection between the first proxy device and a second proxy device. Therefore, when sending the first IP packet to the second proxy device, the first proxy device needs to sequentially encapsulate an MPTCP header and a new IP header (referred to as a second IP header below) outside the first IP packet such that transmission may be performed using the MPTCP connection between the first proxy device and the second proxy device.

When a packet is transmitted between devices, a MTU is set, to indicate a maximum length of the packet transmitted between the devices. Generally, a length allowed by the MTU is used in transmission between the devices. Therefore, a length of the first IP packet may usually reach the MTU. However, after the MPTCP header and the second IP header are encapsulated outside the first IP packet, a length is much greater than the MTU. In this case, the first proxy device cannot transmit the first IP packet outside which the MPTCP header and the second IP header are encapsulated. Therefore, in this embodiment of the present disclosure, the first proxy device divides the UDP packet in the first IP packet into at least two segments, and then encapsulates the first IP header, the MPTCP header, and the second IP header outside each of the at least two segments for transmission. In this way, a segment obtained after encapsulation can be shorter than or as long as the MTU, and the first proxy device can transmit the packet.

To ensure that a length of each of the at least two segments after the first IP header, the MPTCP header, and the second IP header are encapsulated is not greater than the MTU, when the segments are divided, it needs to be ensured that a sum of a length of each segment and a length of the first IP header is less than or equal to a difference between the MTU and a first length. The first length is a sum of a length of the MPTCP header corresponding to each segment and a length of the second IP header corresponding to each segment.

When the length of each segment after the first IP header, the MPTCP header, and the second IP header are encapsulated is less than or equal to the MTU, the byte length allowed by the MTU can be met. In other words, a sum of the length of each segment, the length of the first IP header, the length of the MPTCP header, and the length of the second IP header is less than or equal to the MTU. Therefore, when the UDP packet is divided into segments, a sum of a length of each segment and the length of the first IP header may be made less than or equal to the difference between the MTU and the first length. The first length is the sum of the length of the MPTCP header corresponding to each segment and the length of the second IP header corresponding to each segment.

The first proxy device may determine the length of the first IP header using the first IP packet. The length of the MPTCP header and the length of the second IP header may be calculated with reference to a function of the first IP packet. Therefore, when dividing the UDP packet into segments, the first proxy device may determine a maximum value of a length of each segment based on the MTU, the length of the first IP header, the length of the MPTCP header, and the length of the second IP header.

To simplify a data processing process of the first proxy device, in this embodiment of the present disclosure, a specific setting may be as follows. A sum of a length of each of at least one segment and the length of the first IP header is less than or equal to a preset length, a preset length is a difference between the MTU and a first preset value, and the first preset value is a sum of a maximum value of an MPTCP header length and a maximum value of an IP header length.

The length of the MPTCP header corresponding to each segment is necessarily less than or equal to the maximum value of the MPTCP header length, and the length of the second IP header corresponding to each segment is necessarily less than or equal to the maximum value of the IP header length. Therefore, the first preset value is necessarily greater than or equal to the first length. In an embodiment, the difference between the MTU and the first preset value is necessarily less than or equal to the difference between the MTU and the first length. Therefore, in this embodiment of the present disclosure, the first proxy device may determine a sum of the length of each segment and the length of the first IP packet based on the MTU, the maximum value of the MPTCP header length, and the maximum value of the IP header length, and the determined sum of the length of each segment and the length of the first IP packet is necessarily less than or equal to the difference between the MTU and the first length. Therefore, it can be ensured that the length of each segment after the first IP header, the MPTCP header, and the second IP header are encapsulated is not greater than the MTU.

Usually, both the maximum value of the MPTCP header length and the maximum value of the IP header length are 60 bytes. Therefore, in this embodiment of the present disclosure, the first preset value may be set to 120 bytes.

It should be noted that a manner in which the first proxy device divides the UDP packet into segments is not limited, provided that the sum of the length of each segment and the length of the first IP header is less than or equal to the difference between the MTU and the first length. The first length is the sum of the length of the MPTCP header corresponding to each segment and the length of the second IP header corresponding to each segment. The first proxy device divides the UDP packet in the first IP packet into at least two segments, and a target QoS level of a UDP packet included in each of the at least two segments is the same as the target QoS level of the UDP packet in the first IP packet.

104. The first proxy device encapsulates each of the at least two segments into an MPTCP packet.

After dividing the UDP packet into the at least two segments in step 103, the first proxy device encapsulates each segment into an MPTCP packet.

When encapsulating each of the at least two segments, the first proxy device needs to first encapsulate the first IP header such that each segment can be transmitted to a destination address in the first IP header. In this case, each segment is payload corresponding to the first IP header. Therefore, the payload length indication field in the first IP header is modified to a length of each segment. In an embodiment, when the first IP header is encapsulated for each segment, the payload length indication field in the first IP header is modified to a length of the segment, to ensure accuracy of information in the first IP header.

For each segment, the first proxy device encapsulates a first IP header having a payload length indication field modified, and then encapsulates the MPTCP header, that is, encapsulates each of the at least two segments into the MPTCP packet.

105. The first proxy device encapsulates each MPTCP packet into at least one second IP packet.

A payload length of a target IP packet in the at least one second IP packet is equal to a byte length corresponding to the target QoS level. In this embodiment of the present disclosure, when encapsulating each MPTCP packet into the at least one second IP packet, the first proxy device reflects a target QoS level of each MPTCP packet using the payload length of the target IP packet in the at least one second IP packet. Usually, a payload length of an IP packet is carried in an IP header. Therefore, a second IP header of the target IP packet may carry the payload length.

The target IP packet may be a packet at a preset location in the at least one second IP packet, for example, a start IP packet in the at least one second IP packet or a last IP packet in the at least one second IP packet.

Lengths of MPTCP packets are different, and sometimes a length of an MPTCP packet cannot reach the byte length corresponding to the target QoS level. In this case, padding data needs to be added to the MPTCP packet.

Specifically, when encapsulating each MPTCP packet, the first proxy device may further compare a length of the MPTCP packet with the byte length corresponding to the target QoS level.

For a first MPTCP packet that is in the MPTCP packets and whose length is greater than the byte length corresponding to the target QoS level, the first MPTCP packet may be divided into at least two MPTCP packet fragments, and a length of a target MPTCP packet fragment in the at least two MPTCP packet fragments is equal to the byte length corresponding to the target QoS level. The at least two MPTCP packet fragments are encapsulated into corresponding second IP packets, and a second IP packet corresponding to the target MPTCP packet fragment is the target IP packet. For a second MPTCP packet that is in the MPTCP packets and whose length is less than the byte length corresponding to the target QoS level, padding data may be added to the second MPTCP packet such that a length of the second MPTCP packet to which the padding data is added is equal to the byte length corresponding to the target QoS level. The second MPTCP packet to which the padding data is added is encapsulated into a corresponding second IP packet, and the second IP packet corresponding to the second MPTCP packet to which the padding data is added is the target IP packet. For a third MPTCP packet that is in the MPTCP packets whose length is equal to the byte length corresponding to the target QoS level, the third MPTCP packet may be directly encapsulated into a corresponding second IP packet, namely, the target IP packet.

When the length of the MPTCP packet is greater than the byte length corresponding to the target QoS level, because the length of the target MPTCP packet fragment needs to be equal to the byte length corresponding to the target QoS level, the first proxy device may divide the MPTCP packet into at least two MPTCP packet fragments. During division, the length of the target MPTCP packet fragment is equal to the byte length corresponding to the target QoS level, and a length and a quantity of remaining fragments may be determined based on a requirement in an actual scenario or the length of the MPTCP packet. After dividing the MPTCP packet into the MPTCP packet fragments, the first proxy device encapsulates each of the MPTCP packet fragments into a corresponding second IP packet. The target IP packet is a second IP packet obtained after the target MPTCP packet fragment is encapsulated, and each of the MPTCP packet fragments is payload of the corresponding second IP packet.

When the length of the MPTCP packet is less than the byte length corresponding to the target QoS level, the length of the MPTCP packet cannot reach the byte length corresponding to the target QoS level. Therefore, padding data needs to be added to the MPTCP packet such that a length of the MPTCP packet to which the padding data is added is equal to the length corresponding to the target QoS level. In this case, the MPTCP packet to which the padding data is added is payload of the target IP packet. Then, the first proxy device encapsulates the MPTCP packet to which the padding data is added into a corresponding second IP packet, namely, the target IP packet.

When the length of the MPTCP packet is equal to the length corresponding to the target QoS level, the first proxy device may directly encapsulate the MPTCP packet into a corresponding second IP packet, namely, the target IP packet.

It should be noted that, when the padding data is added to the MPTCP packet, the padding data may be added behind payload corresponding to the first IP header.

Correspondingly, before the padding data is added, the payload length indication field in the first IP header may indicate a length of a corresponding segment, when the padding data is added, the payload length indication field in the first IP header may indicate a sum of the length of the corresponding segment and a length of the added padding data, or may indicate the length of the corresponding segment. The padding data may be a number, and further may be 0.

In this embodiment of the present disclosure, the first proxy device may preset a correspondence between a QoS level and a byte length. Therefore, before step 105 is performed, the first proxy device may determine, based on the correspondence between a QoS level and a byte length, the byte length corresponding to the target QoS level. In addition, if the first proxy device sets the QoS value corresponding to the QoS level, a correspondence between the QoS value and the byte length may be further set.

Figure 3:
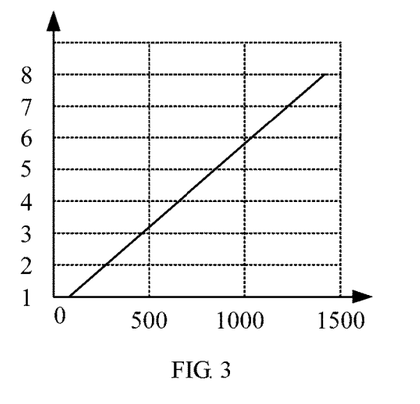
FIG. 3 is a schematic diagram of a mapping curve between a fragment length and a QoS value according to an embodiment of the present disclosure.

In this embodiment of the present disclosure, the correspondence between a QoS level and a byte length may be set using a preset function or a correspondence table. A specific correspondence may be set based on a specific service stream. For example, a correspondence table shown in Table 1 may be established. In this case, a mapping curve between a QoS level and a byte length is shown in FIG. 3. In FIG. 3, a horizontal coordinate represents a length, and a vertical coordinate represents a QoS level.

TABLE 1

| QoS level | 1 | 2 | 3 | 4 | 5 | 6 | 7 | 8 |
|---|---|---|---|---|---|---|---|---|
| Byte length | 40 | 240 | 440 | 640 | 840 | 1040 | 1240 | 1440 |

Because a payload length of a second IP packet is used to indicate a corresponding QoS level, a length corresponding to any QoS level in the setting needs to be less than a difference 1440 between a length 1500 of the MTU and a maximum value 60 of the IP header length. As shown in Table 1, a maximum length corresponding to the QoS level is 1440.

It should be noted that the correspondence between a QoS level and a byte length needs to meet the following requirements. The correspondence complies with a protocol principle and cannot violate a protocol rule, and the correspondence between a QoS level and a byte length is a one-to-one correspondence.

To reduce operations of adding padding data to an MPTCP packet, and make a length of each MPTCP packet greater than the byte length corresponding to the target QoS level, the first proxy device may set a byte length corresponding to a QoS level to a relatively small value. Specifically, a maximum value of the byte length corresponding to the QoS level may be less than or equal to a sum of a minimum value of the MPTCP header length and a minimum value of the IP header length.

Because the MPTCP packet is obtained after the first IP header and the MPTCP header are encapsulated for each segment, a length of the MPTCP packet is necessarily greater than the sum of the minimum value of the MPTCP header length and the minimum value of the IP header length. Therefore, when the maximum value of the byte length corresponding to the QoS level is less than or equal to the sum of the minimum value of the MPTCP header length and the minimum value of the IP header length, the payload length of the target IP packet is less than the sum of the minimum value of the MPTCP header length and the minimum value of the IP header length, and the length of the MPTCP packet is necessarily greater than or equal to the maximum value of the byte length corresponding to the QoS level. In other words, the length of the MPTCP packet is necessarily greater than or equal to the byte length corresponding to the target QoS level. Therefore, operations of adding padding data to an MPTCP packet can be decreased or reduced, to simplify the data processing process.

Both the minimum value of the MPTCP header length and the minimum value of the IP header length are 20 bytes. Therefore, the length corresponding to the target QoS level may be less than or equal to 40 bytes.

It should be noted that in this embodiment of the present disclosure, by setting the byte length corresponding to the QoS level, it is ensured that the length of the MPTCP packet is necessarily greater than or equal to the byte length corresponding to the target QoS level. Therefore, in this step, the first proxy device may not compare the length of the MPTCP packet with the byte length corresponding to the target QoS level, but directly perform the operation of dividing the first MPTCP packet into at least two MPTCP packet fragments.

It should be noted that, in this step, an IP header added by the first proxy device when the first proxy device encapsulates each MPTCP packet into a corresponding second IP packet is the second IP header in step 103. In other words, the second IP header is an IP header on an outermost side of a second IP packet corresponding to each segment obtained in step 103.

106. The first proxy device sends the at least one second IP packet to a second proxy device using an MPTCP connection with the second proxy device After encapsulating each MPTCP packet into the at least one second IP packet, the first device may send the at least one second IP packet using the MPTCP connection between the first proxy device and the second proxy device.

In this embodiment of the present disclosure, the MPTCP header in the second IP packet usually includes source port information and destination port information, and the second IP header on the outmost side of the second IP packet usually includes source address information and destination address information.

107. After receiving the at least one second IP packet that belongs to a same MPTCP packet using the MPTCP connection with the first proxy device, the second proxy device obtains a payload length of a target IP packet in the at least one second IP packet.

After receiving second IP packets using the MPTCP connection with the first proxy device, the second proxy device may identify, based on second IP headers in the second IP packets, second IP packets that belong to a same MPTCP packet. A location of a target IP packet in the second IP packets of the same MPTCP packet is preset in the second proxy device. Therefore, the target IP packet in the second IP packets that belong to the same MPTCP packet may be determined, and a payload length of the target IP packet may be obtained. Specifically, the payload length of the target IP packet may be obtained from an IP header of the target IP packet.

108. The second proxy device determines the target QoS level of the at least one second IP packet based on the payload length of the target IP packet.

In this embodiment of the present disclosure, the first proxy device divides the received UDP packet into the at least two segments. After each segment is encapsulated into an MPTCP packet, the MPTCP packet is encapsulated into at least one second IP packet, and the payload length of the target IP packet in the at least one second IP packet is equal to the byte length corresponding to the target QoS level. In other words, a target QoS level of the same MPTCP packet is indicated using the payload length of the target IP packet. Therefore, in this embodiment of the present disclosure, after the first proxy device sends the at least one second IP packet obtained through encapsulation to the second proxy device using the MPTCP connection, the second proxy device may accurately determine the target QoS level of the same MPTCP packet based on the payload length of the target IP packet, and accurately perform corresponding QoS processing on the at least one second IP packet that belongs to the same MPTCP packet. This avoids a problem that the peer device cannot determine the corresponding QoS processing on the UDP packet because there is no QoS information in an IP header encapsulated on an outermost side of the UDP packet.

Figure 4:
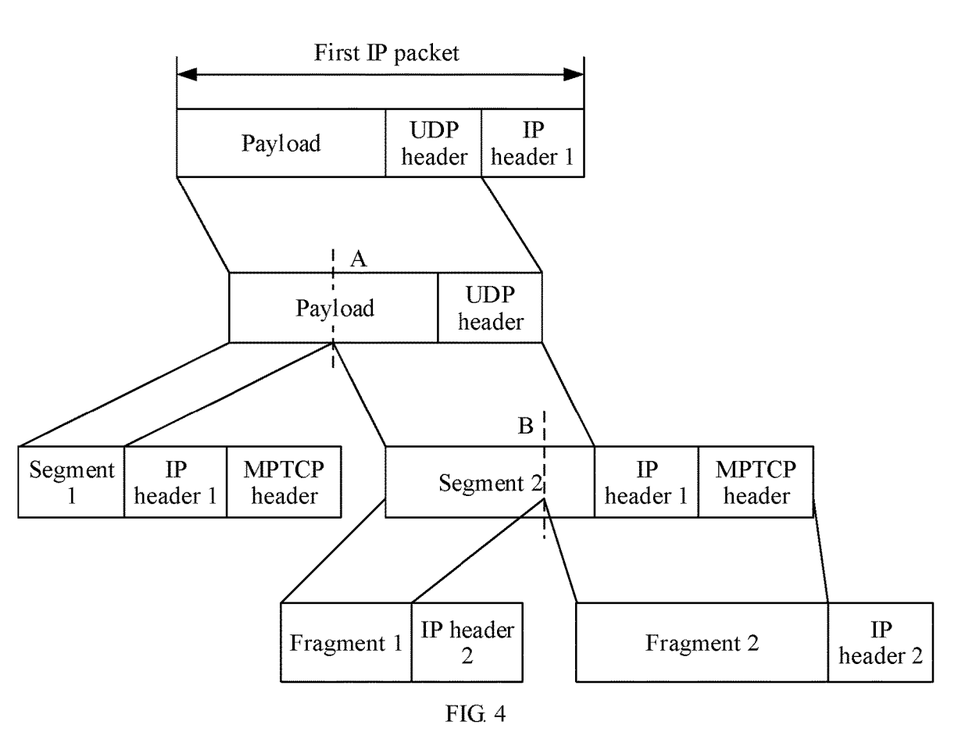
FIG. 4 is a schematic diagram of a process of processing a first IP packet according to an embodiment of the present disclosure.

In this embodiment of the present disclosure, a process of processing the first IP packet by the first proxy device in step 103 to step 105 is described using a schematic diagram shown in FIG. 4 as an example. The first proxy device receives the first IP packet in step 101. The first IP packet includes a UDP packet and a first IP header. In FIG. 4, an IP header 1 represents the first IP header, and the UDP packet includes two parts a UDP header and payload. In step 103, the first proxy device divides the UDP packet into at least two segments. As shown in FIG. 4, for example, the UDP packet is divided into two segments by the first proxy device. The UDP packet including the UDP header and the payload is divided by a dashed line A, to obtain two segments a segment 1 and a segment 2. A sum of a length of each segment and a length of the IP header 1 is less than or equal to a difference between an MTU and a first length. The first length is a sum of a length of an MPTCP header corresponding to each segment and a length of a second IP header corresponding to each segment. Then, step 104 is performed. In an embodiment, the first proxy device encapsulates each segment into an MPTCP packet. As shown in FIG. 4, the IP header 1 and the MPTCP header are encapsulated for each of the segment 1 and the segment 2. In other words, the first IP header and the MPTCP header are encapsulated. When the IP header 1 is encapsulated, a payload length indication field in the IP header 1 is modified to a length of each segment. Then, step 105 is performed. In an embodiment, the first proxy device encapsulates each MPTCP packet into at least one second IP packet. As shown in FIG. 4, for example, an MPTCP packet obtained after the segment 2 is encapsulated is encapsulated into two second IP packets, and a target IP packet is a start IP packet in the two second IP packets. The first proxy device divides, by a dashed line B, the MPTCP packet obtained after the segment 2 is encapsulated into two MPTCP packet fragments a fragment 1 and a fragment 2. The fragment 2 is a start MPTCP packet fragment, namely, a target MPTCP packet fragment. Then, each of the MPTCP packet fragments is encapsulated into a second IP packet. In FIG. 4, an IP header 2 represents the second IP header, and the second IP packet including the fragment 2 and the corresponding IP header 2 is the target IP packet.

Figure 5:
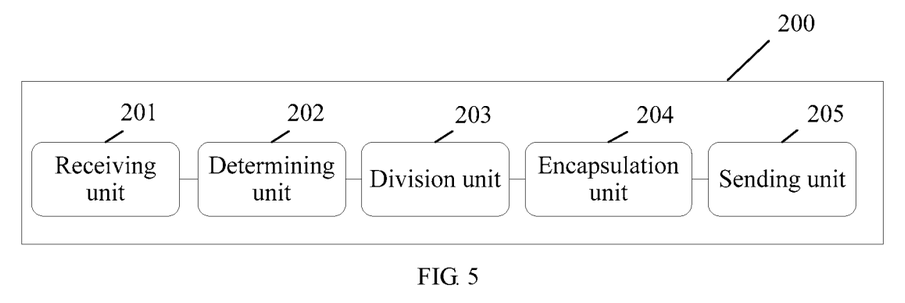
FIG. 5 is a schematic block diagram of an apparatus for determining QoS according to an embodiment of the present disclosure.

FIG. 5 is a schematic block diagram of an apparatus 200 for determining QoS according to an embodiment of the present disclosure. As shown in FIG. 5, the apparatus 200 includes a receiving unit 201 configured to receive a first IP packet, where the first IP packet includes a UDP packet and a first IP header, a determining unit 202 configured to determine, based on information in the first IP packet, a target QoS level to which the UDP packet belongs, a division unit 203 configured to divide the UDP packet into at least two segments, an encapsulation unit 204 configured to encapsulate each of the at least two segments into a MPTCP packet, where the encapsulation unit 204 is further configured to encapsulate each MPTCP packet into at least one second IP packet, and a payload length of a target IP packet in the at least one second IP packet is equal to a byte length corresponding to the target QoS level, and a sending unit 205 configured to send the at least one second IP packet to a peer device using an MPTCP connection with the peer device such that the peer device determines the target QoS level based on the payload length of the target IP packet.

In this embodiment of the present disclosure, the received UDP packet is divided into at least two segments. After each segment is encapsulated into an MPTCP packet, the MPTCP packet is encapsulated into at least one second IP packet. In addition, the payload length of the target IP packet in the at least one second IP packet is equal to the byte length corresponding to the target QoS level. In other words, a target QoS level of a same MPTCP packet is indicated using the payload length of the target IP packet. Therefore, in this embodiment of the present disclosure, after the second IP packet obtained through encapsulation is sent to the peer device using the MPTCP connection, the peer device may accurately determine the target QoS level of the same MPTCP packet based on the payload length of the target IP packet, and accurately perform corresponding QoS processing on the UDP packet. This avoids a problem that the peer device cannot determine the corresponding QoS processing on the UDP packet because there is no QoS information in an IP header encapsulated on an outermost side of the UDP packet.

It may be understood that when encapsulating each of the at least two segments into an MPTCP packet, the encapsulation unit 204 is further configured to, for a first MPTCP packet in all the MPTCP packets, divide the first MPTCP packet into at least two MPTCP packet fragments, where a length of a target MPTCP packet fragment in the at least two MPTCP packet fragments is equal to the byte length corresponding to the target QoS level, and a length of the first MPTCP packet is greater than the byte length corresponding to the target QoS level, and encapsulate the at least two MPTCP packet fragments into corresponding second IP packets, where a second IP packet corresponding to the target MPTCP packet fragment is the target IP packet.

It may be understood that when encapsulating each of the at least two segments into an MPTCP packet, the encapsulation unit 204 is further configured to, for a second MPTCP packet in all the MPTCP packets, add padding data to the second MPTCP packet such that a length of the second MPTCP packet to which the padding data is added is equal to the byte length corresponding to the target QoS level, where a length of the second MPTCP packet is less than the byte length corresponding to the target QoS level, and encapsulate the second MPTCP packet to which the padding data is added into a corresponding second IP packet, where the second IP packet corresponding to the second MPTCP packet to which the padding data is added is the target IP packet.

It may be understood that the target IP packet is a start IP packet in the at least one second IP packet.

It may be understood that a sum of a length of each of the at least two segments and a length of the first IP header is less than or equal to a difference between a MTU and a first length, and the first length is a sum of a length of an MPTCP header corresponding to each segment and a length of an IP header of a second IP packet corresponding to each segment.

It may be understood that a sum of a length of each of the at least one segment and the length of the first IP header is less than or equal to a preset length, the preset length is a difference between the MTU and a first preset value, and the first preset value is a sum of a maximum value of an MPTCP header length and a maximum value of an IP header length.

It may be understood that the determining unit 202 is further configured to determine, based on a correspondence between a QoS level and a byte length, the byte length corresponding to the target QoS level.

It may be understood that the correspondence between a QoS level and a byte length is preset, and a maximum value of a byte length corresponding to each QoS level in the correspondence is less than or equal to a sum of a minimum value of the MPTCP header length and a minimum value of the IP header length.

It may be understood that when encapsulating each of the at least two segments into an MPTCP packet, the encapsulation unit is further configured to encapsulate the first IP header for each segment, where a payload length indication field in the first IP header is modified to a length of the corresponding segment, and encapsulate each segment after the first IP header is encapsulated into an MPTCP packet.

The apparatus 200 for determining QoS according to this embodiment of the present disclosure may correspond to an entity for executing the method for determining QoS according to the foregoing embodiment of the present disclosure, and the foregoing and other operations and/or functions of the modules in the apparatus 200 for determining QoS are separately used to implement corresponding procedures of the methods executed by the first proxy device in FIG. 2. For brevity, details are not described herein again.

Figure 6:
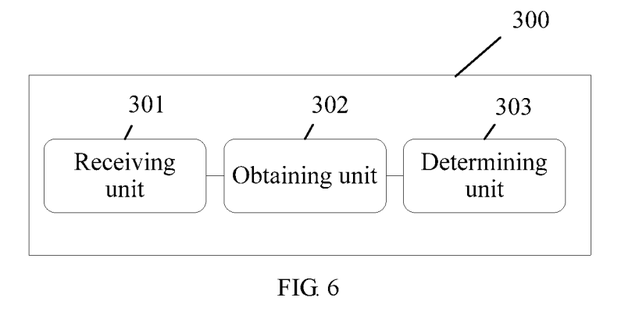
FIG. 6 is a schematic block diagram of an apparatus for determining QoS according to another embodiment of the present disclosure.

FIG. 6 is a schematic block diagram of an apparatus 300 for determining QoS according to another embodiment of the present disclosure. As shown in FIG. 6, the apparatus 300 includes a receiving unit 301 configured to receive, using a MPTCP connection with a peer device, at least one IP packet that belongs to a same MPTCP packet and that is sent by the peer device, an obtaining unit 302 configured to obtain a payload length of a target IP packet in the at least one IP packet, and a determining unit 303 configured to determine, based on the payload length of the target IP packet, a target QoS level of the at least one IP packet.

In this embodiment of the present disclosure, the peer device indicates a target QoS level of the same MPTCP packet using the payload length of the target IP packet. Therefore, after the at least one IP packet that belongs to the same MPTCP packet is received, the target QoS level of the same MPTCP packet may be accurately determined based on the payload length of the target IP packet in the at least one IP packet, and corresponding QoS processing may be accurately performed on a UDP packet. This avoids a problem that the corresponding QoS processing on the UDP packet cannot be determined because there is no QoS information in an IP header encapsulated on an outermost side of the UDP packet.

It may be understood that the target IP packet is a start IP packet in the at least one IP packet.

It may be understood that the payload length of the target IP packet is less than or equal to a sum of a minimum value of an MPTCP header length and a minimum value of an IP header length.

The apparatus 300 for determining QoS according to this embodiment of the present disclosure may correspond to an entity for executing the method for determining QoS according to the foregoing embodiment of the present disclosure, and the foregoing and other operations and/or functions of the modules in the apparatus 300 for determining QoS are separately used to implement corresponding procedures of the methods executed by the second proxy device in FIG. 2. For brevity, details are not described herein again.

Figure 7:
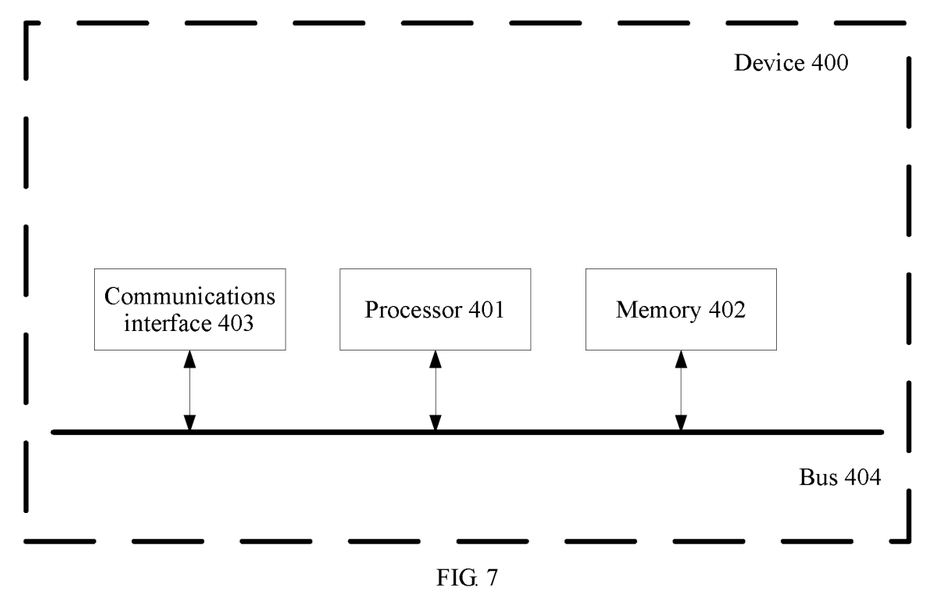
FIG. 7 is a schematic block diagram of a device for determining QoS according to an embodiment of the present disclosure.

FIG. 7 is a schematic block diagram of a device 400 for determining QoS according to an embodiment of the present disclosure. The device 400 is connected to a plurality of hard disks. As shown in FIG. 7, the device 400 includes a processor 401, a memory 402, and a communications interface 403. The memory 402 is configured to store executable program code. The processor 401 runs, by reading the executable program code stored in the memory 402, a program corresponding to the executable program code. The communications interface 403 is configured to communicate with an external device. The device 400 may further include a bus 404. The bus 404 is configured to connect the processor 401, the memory 402, and the communications interface 403 such that the processor 401, the memory 402, and the communications interface 403 communicate with each other using the bus 404.

The device 400 according to this embodiment of the present disclosure may correspond to an entity for executing the method for determining QoS according to the foregoing embodiment of the present disclosure, and the foregoing operations and/or functions in the device 400 are separately used to implement corresponding procedures of the methods executed by the first proxy device in FIG. 2. For brevity, details are not described herein again.

Figure 8:
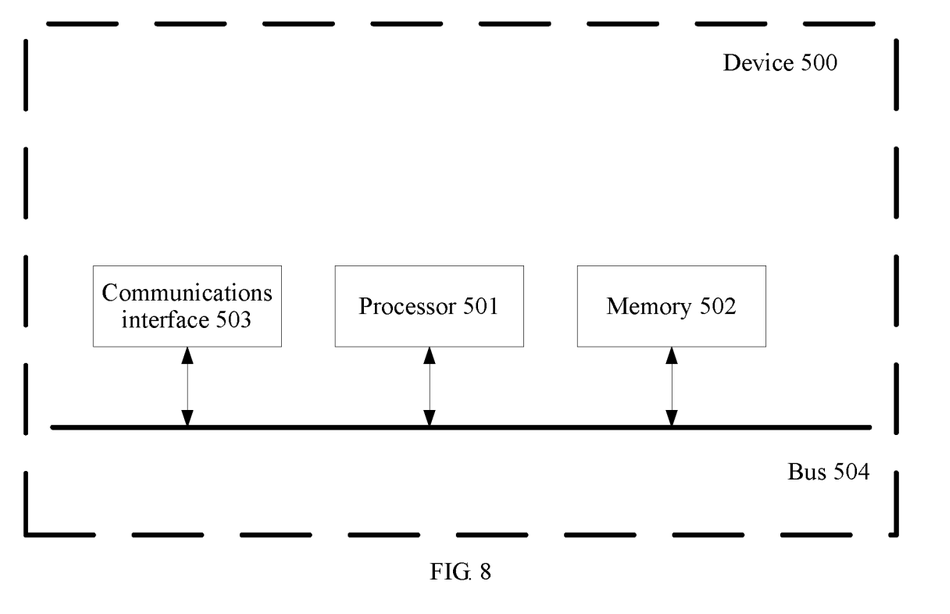
FIG. 8 is a schematic block diagram of a device for determining QoS according to another embodiment of the present disclosure.

FIG. 8 is a schematic block diagram of a device 500 for determining QoS according to another embodiment of the present disclosure. The device 500 is connected to a plurality of hard disks. As shown in FIG. 8, the device 500 includes a processor 501, a memory 502, and a communications interface 503. The memory 502 is configured to store executable program code. The processor 501 runs, by reading the executable program code stored in the memory 502, a program corresponding to the executable program code. The communications interface 503 is configured to communicate with an external device. The device 500 may further include a bus 504. The bus 504 is configured to connect the processor 501, the memory 502, and the communications interface 503 such that the processor 501, the memory 502, and the communications interface 503 communicate with each other using the bus 504.

The device 500 according to this embodiment of the present disclosure may correspond to an entity for executing the method for determining QoS according to the foregoing embodiment of the present disclosure, and the foregoing operations and/or functions in the device 500 are separately used to implement corresponding procedures of the methods executed by the first proxy device in FIG. 2. For brevity, details are not described herein again.

All or some of the foregoing embodiments may be implemented using software, hardware, firmware, or any combination thereof. When software is used to implement the embodiments, the embodiments may be implemented fully or partially in a form of a computer program product. The computer program product includes one or more computer instructions. When the computer program instructions are loaded and executed on a computer, all or some of the procedure or functions according to the embodiments of the present disclosure are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one web site, computer, server, or data center to another web site, computer, server, or data center in a wired (for example, a coaxial cable, an optical fiber, or a DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

What is claimed is:

1. A method for determining quality of service (QoS), comprising:
   receiving a first Internet protocol (IP) packet, wherein the first IP packet comprises a User Datagram Protocol (UDP) packet and a first IP header;
   determining a target QoS level to which the UDP packet belongs based on information in the first IP packet;
   dividing the UDP packet into at least two segments;
   encapsulating each of the at least two segments into a Multipath Transmission Control Protocol (MPTCP) packet;
   encapsulating each MPTCP packet into at least one second IP packet, wherein a payload length of a target IP packet in the at least one second IP packet is equal to a first byte length corresponding to the target QoS level; and
   sending the at least one second IP packet to a peer device using an MPTCP connection to prompt the peer device to determine the target QoS level based on the payload length of the target IP packet.

2. The method of claim 1, further comprising:
   dividing a first MPTCP packet of the at least two MPTCP packets into at least two MPTCP packet fragments, wherein the at least two MPTCP packet fragments comprise a target MPTCP packet fragment, wherein a length of the target MPTCP packet fragment is equal to the first byte length, and wherein a length of the first MPTCP packet is greater than the first byte length; and
   encapsulating the at least two MPTCP packet fragments into corresponding second IP packets, wherein the at least one second IP packet corresponding to the target MPTCP packet fragment is the target IP packet.

3. The method of claim 1, further comprising:
   adding padding data to a second MPTCP packet of the at least two MPTCP packets such that a length of the second MPTCP packet is equal to the first byte length; and
   encapsulating the second MPTCP packet into a corresponding second IP packet after adding the padding data, wherein the at least one second IP packet corresponding to the second MPTCP packet is the target IP packet.

4. The method of claim 1, wherein the target IP packet is a start IP packet in the at least one second IP packet.

5. The method of claim 1, wherein a sum of a length of each of the at least two segments and a length of the first IP header is less than or equal to a difference between a length of a maximum transmission unit (MTU) and a composite length, and wherein the composite length is a sum of a length of an MPTCP header of each of the at least two segments and a length of a second IP header of a second IP packet of each of the at least two segments.

6. The method of claim 5, wherein the sum of the length of each of the at least two segments and the length of the first IP header is less than or equal to a preset length, wherein the preset length is a difference between the MTU and a first preset value, and wherein the first preset value is a sum of a maximum value of a length of an MPTCP header and a maximum value of a length of an IP header.

7. The method of claim 1, further comprising determining, based on a correspondence between a QoS level and a byte length, the byte length corresponding to the target QoS level.

8. The method for determining QoS of claim 7, wherein the correspondence between the QoS level and the byte length is preset, and wherein a maximum value of the byte length corresponding to each QoS level in the correspondence is less than or equal to a sum of a minimum value of the MPTCP packet header length and a minimum value of a length of an IP header.

9. The method of claim 1, further comprising:
   encapsulating the first IP header for each of the at least two segments;
   modifying a payload length indication field in the first IP header to a length of a corresponding segment of each of the at least two segments; and
   encapsulating each of the at least two segments after the first IP header is encapsulated into an MPTCP packet.

10. A method for determining quality of service (QoS), comprising:
    receiving at least one Internet protocol (IP) packet that belongs to a same Multipath Transmission Control Protocol (MPTCP) packet and is from a peer device using an MPTCP connection with the peer device;
    obtaining a payload length of a target IP packet in the at least one IP packet; and
    determining a target QoS level of the at least one IP packet based on the payload length of the target IP packet.

11. The method of claim 10, wherein the target IP packet is a start IP packet in the at least one IP packet.

12. The method of claim 10, wherein the payload length of the target IP packet is less than or equal to a sum of a minimum value of an MPTCP header length and a minimum value of a length of an IP header.

13. An apparatus for determining quality of service (QoS), comprising:
a processor; and
a memory coupled to the processor and storing instructions that, when executed by the processor, cause the apparatus to be configured to:
receive a first Internet protocol (IP) packet, wherein the first IP packet comprises a User Datagram Protocol (UDP) packet and a first IP header;
determine a target QoS level to which the UDP packet belongs based on information in the first IP packet;
divide the UDP packet into at least two segments;
encapsulate each of the at least two segments into a Multipath Transmission Control Protocol (MPTCP) packet;
encapsulate each MPTCP packet into at least one second IP packet, wherein a payload length of a target IP packet in the at least one second IP packet is equal to a first byte length corresponding to the target QoS level; and
send the at least one second IP packet to a peer device using an MPTCP connection to prompt the peer device to determine the target QoS level based on the payload length of the target IP packet.

14. The apparatus of claim 13, wherein the instructions further cause the apparatus for determining QoS to be configured to:
divide a first MPTCP packet of the at least two MPTCP packets into at least two MPTCP packet fragments, wherein the at least two MPTCP packet fragments comprise a target MPTCP packet fragment, wherein a length of the target MPTCP packet fragment is equal to the first byte length, and wherein a length of the first MPTCP packet is greater than the first byte length; and
encapsulate the at least two MPTCP packet fragments into a corresponding second IP packets, wherein the at least one second IP packet corresponding to the target MPTCP packet fragment is the target IP packet.

15. The apparatus of claim 13, wherein the instructions further cause the apparatus to:
add padding data to a second MPTCP packet of the at least two MPTCP packets such that a length of the second MPTCP packet is equal to the first byte length; and
encapsulate the second MPTCP packet into a corresponding second IP packet after adding the padding data, wherein the at least one second IP packet corresponding to the second MPTCP packet is the target IP packet.

16. The apparatus of claim 13, wherein the target IP packet is a start IP packet in the at least one second IP packet.

17. The apparatus of claim 13, wherein a sum of a length of each of the at least two segments and a length of the first IP header is less than or equal to a difference between a maximum transmission unit (MTU) and a composite length, and wherein the composite length is a sum of a length of an MPTCP header of each of the at least two segments and a length of a second IP header of a second IP packet corresponding to each of the at least two segments.

18. The apparatus of claim 17, wherein the sum of the length of each of the at least two segments and the length of the first IP header is less than or equal to a preset length, wherein the preset length is a difference between the MTU and a first preset value, and wherein the first preset value is a sum of a maximum value of a length of an MPTCP header and a maximum value of a length of an IP header.

19. An apparatus for determining quality of service (QoS), comprising:
a processor; and
a memory coupled to the processor and storing instructions that, when executed by the processor, cause the apparatus for determining QoS to be configured to:
receive at least one Internet protocol (IP) packet that belongs to a same Multipath Transmission Control Protocol (MPTCP) packet and is from a peer device using an MPTCP connection with the peer device;
obtain a payload length of a target IP packet in the at least one IP packet; and
determine a target QoS level of the at least one IP packet based on the payload length of the target IP packet.

20. The apparatus for determining QoS of claim 19, wherein the target IP packet is a start IP packet in the at least one IP packet.

* * * * *

UNITED STATES PATENT AND TRADEMARK OFFICE
CERTIFICATE OF CORRECTION

PATENT NO. : 11,405,489 B2
APPLICATION NO. : 16/832676
DATED : August 2, 2022
INVENTOR(S) : Boyuan Yu et al.

It is certified that error appears in the above-identified patent and that said Letters Patent is hereby corrected as shown below:

On the Title Page

Page 2, Item (56) References Cited, Other Publications: "Miori, S., et al., "Cross-Layer" should read "Mori, S., et al., "Cross-Layer"

Signed and Sealed this
Twenty-seventh Day of September, 2022

Katherine Kelly Vidal
*Director of the United States Patent and Trademark Office*